Sept. 24, 1968   B. EISENBACH   3,402,640
MILLING TOOL
Filed Jan. 24, 1966   4 Sheets-Sheet 1
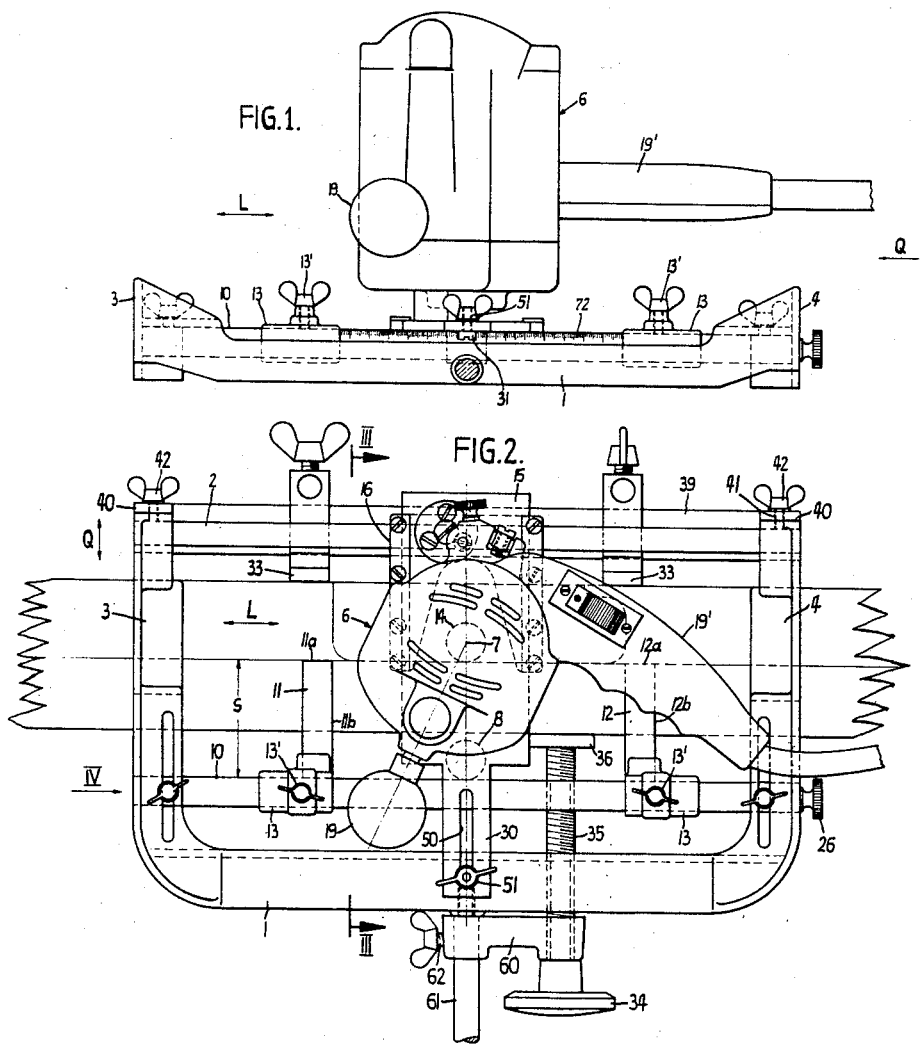
INVENTOR.
BERNHARD EISENBACH
BY
ATTORNEYS Sept. 24, 1968   B. EISENBACH   3,402,640
MILLING TOOL
Filed Jan. 24, 1966   4 Sheets-Sheet 2
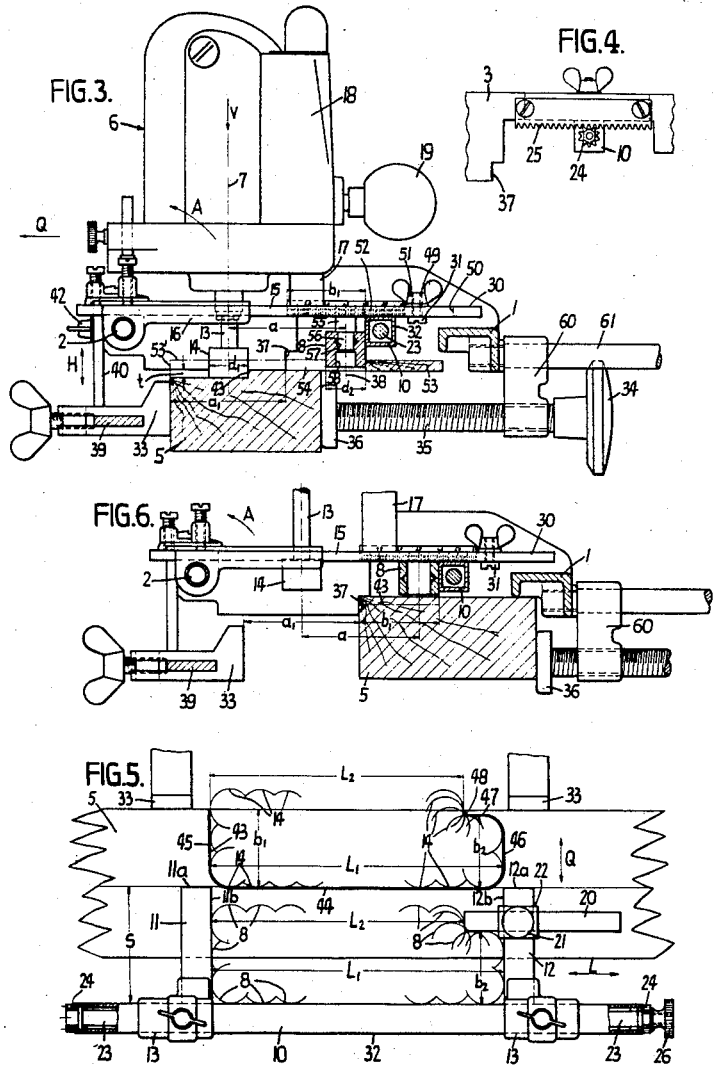
INVENTOR.
BERNHARD EISENBACH
BY
Woodhams, Blanchard and Flynn
ATTORNEYS

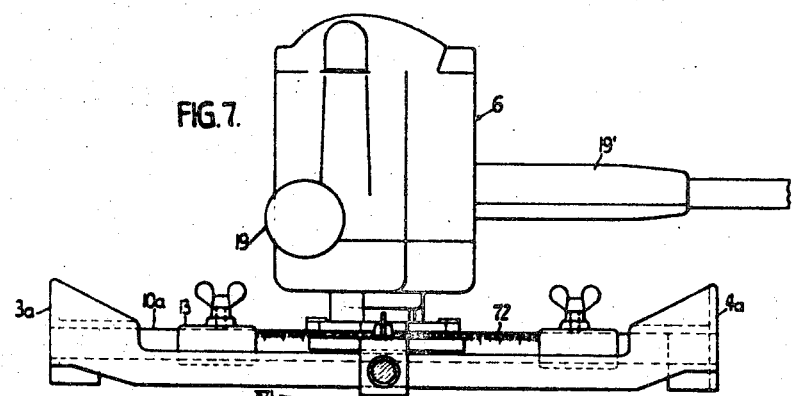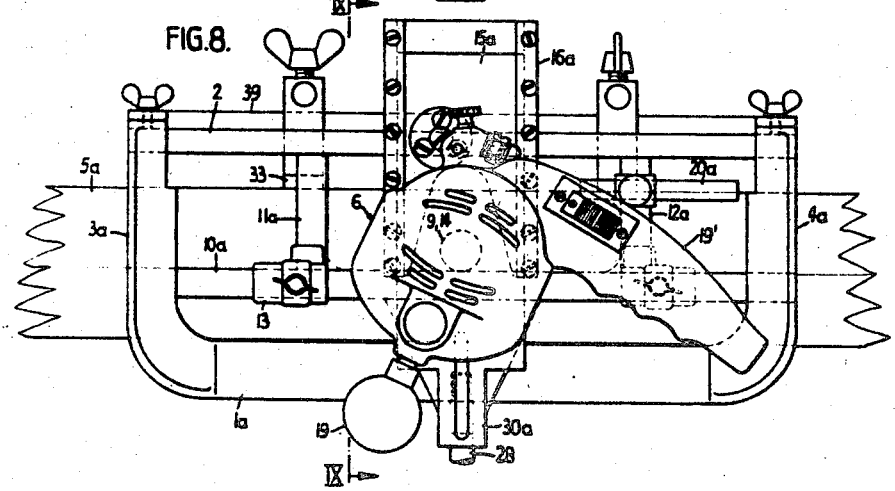

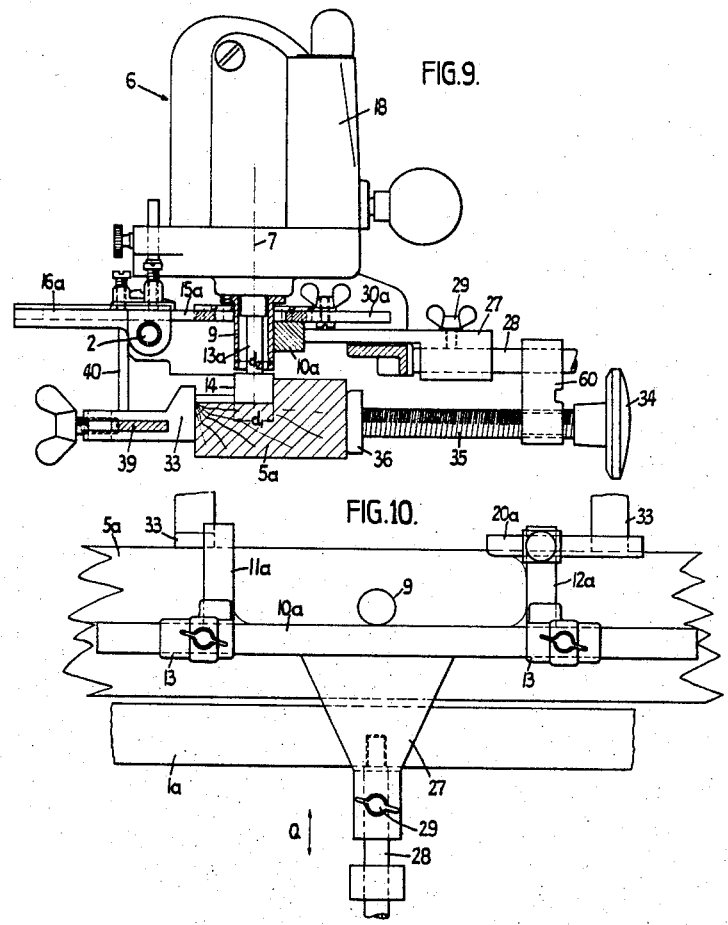

United States Patent Office 3,402,640
Patented Sept. 24, 1968

1

3,402,640
MILLING TOOL
Bernhard Eisenbach, Niederbrechen uber Limburg (Lahn),
Germany, assignor to Eugen Lutz KG, Muhlacker-
Lomersheim, Wurttemberg, Germany
Filed Jan. 24, 1966, Ser. No. 532,032
12 Claims. (Cl. 90—12)

ABSTRACT OF THE DISCLOSURE

A motor-driven milling tool having a copying device connected thereto, the copying device having a frame adapted to be mounted to a workpiece. The milling tool is mounted on the frame so as to be movable longitudinally and transversely relative to the workpiece. A plurality of copying rails, including both longitudinal and transverse rails, are adjustably mounted on the frame and cooperate with a copying member for guiding the movement of the milling tool during the working operation. The milling tool is movably connected to the frame so as to be swingable into a noninterfering position when it is desired to adjust the position of the copying rails.

---

This invention relates to a motor driven hand milling tool with a copying member, for milling recesses in wood, synthetic material or metal, in particular for milling recesses for door, window, furniture fittings and the like, in which a copying member consisting of a roller or sleeve is arranged to be guided along a copying device.

In known apparatus of this type for milling recesses for fittings, there is used a relatively heavy universal milling tool having a base plate to which is secured a guide sleeve coaxial with the milling axis, viz the axis of rotation of the cutter, and projecting from the underside of the base plate. The diameter of this guide sleeve is considerably greater than the diameter of the milling cutter, since the cutter has to be capable of passing through the guide sleeve.

The copying device comprises a frame adapted to be firmly clamped to the work and having interchangeable templates of synthetic material secured in it. The base plate of the tool is placed on these templates and the tool is moved freely by hand, the said guide sleeve being guided in the opening in the template. Since the diameter of the guide sleeve is considerably greater than that of the milling cutter, the openings in the templates must be correspondingly larger than the recesses to be milled. Since the fittings have to be let in from a predetermined edge, e.g. a rabbet edge, in the above mentioned template planes stops are provided which have to be adjusted to keep the milling dimensions in suitable relation to the rabbet edge. Owing to the over-sized guide sleeve and the large openings in the template thereby necessitated, as well as the varying distances from the rabbet edge, it is very difficult for the operator to make these templates himself.

The manufacturer of such milling tools supplies templates with the required openings for the various fittings. Since the manufacturer of the fittings supplies fittings of very varied shapes and dimensions for the same purpose, the manufacturer of the milling tools must keep hundreds of different templates continuously in stock. The present invention, which relates to the motor driven hand operated milling tool with copying device initially mentioned, overcomes the considerable and numerous disadvantages of known tools. The invention is characterised by an approximately rectangular frame which can be firmly clamped to the work, a motor driven milling tool

2 mounted on the frame so as to be movable longitudinally and transversely, a copying member the diameter of which is the same as the milling diameter, and copying rails adjustably mounted on the frame, there being at least one longitudinal rail and two transverse rails, the tool being so connected to the frame that it can be brought out of the range of the frame during adjustment of the copying rails.

With this new motor drive hand milling tool with copying device the hitherto necessary numerous templates for the individual fittings are obviated. The copying rails provided in accordance with the invention can be adjusted before the fitting in question quickly, conveniently and reliably, i.e. without error, this adjustment being made in very simple manner either in accordance with the fitting itself or it has been cut on the work piece. This adjustment is facilitated to a very great degree because the diameter of the copying member agrees exactly with the milling diameter, hence the adjustment takes place in a 1:1 ratio since the boundary lines of the milled recesses coincide with the boundary lines of the copying rails.

A further considerable advantage of the invention is that the tool is relatively small and moreover, is so mounted and guided on the frame firmly clamped to the work that not only is it much more easily handled but also enables milled recesses to be made which agree exactly with the dimensions of the fitting.

Further details and advantages of the invention will now be described in more detail with reference to the accompanying drawings, in which FIG. 1 is a front view of a milling tool with copying device, FIG. 2 is a plan view thereof, FIG. 3 is a section on the line III—III of FIG. 2, FIG. 4 is a part view looking in the direction IV—IV of FIG. 2, FIG. 5 is a plan view of the copying device with a corresponding milled recess, FIG. 6 is a view similar to FIG. 3, with the copying rails adjusted, FIG. 7 is a front view of a milling tool with copying device in accordance with another embodiment of the invention, FIG. 8 is a plan view thereof, FIG. 9 is a section on line IX—IX of FIG. 8, and FIG. 10 is a plan view of the copying rails of this tool with the adjustable mounting thereof.

In the drawing, reference numerals 1, 2 indicate the longitudinal parts and reference numerals 3, 4 the transverse parts of a substantially rectangular frame adapted to be firmly clamped to the piece of work 5. On this frame is mounted a motor driven milling tool 6 which is movable in the longitudinal direction L and in the transverse direction Q, the axis 7 of the motor, when the tool is in milling position, extending at right angles to the plane of the frame, in the example of operation shown. On the tool there is further provided a copying member 8 in the form of a roller (or a sleeve 9 in the case of FIGS. 7 to 10), the diameter $d_2$ of which agrees exactly with the milling diameter $d_1$. On the frame 1–4 are provided adjustable copying rails, there being at least one longitudinal rail 10 and two transverse rails 11, 12. The motor 6, on the shaft 13 of which the milling cutter 14 is mounted, is so connected to the frame 1–4 that upon adjustment of the copying rails 10–12 it can be brought out of their range. For this purpose the longitudinal side of the part 2 of the frame located opposite the copying rails 10–12 is formed as a circular bar, on which the tool 6 is mounted so as to be movable longitudinally and also pivotal about the circular bar 2 in the direction A. As shown in the drawing, when the tool 6 is swung outwardly in the direction A the copying rails 10–12 are freely accessible for the purpose of adjustment. This accessibility may in some cases be achieved in other ways, e.g. by moving the tool transversely in the direction Q (FIG. 3).

In the embodiments of the invention shown the milling tool has a base plate 15, which forms a slide which is movable in a slide carrier 16 in the transverse direction Q, this slide carrier being mounted on the frame, viz on the circular bar 2 so as to be movable longitudinally. The base plate 15 carries a circular pillar 17 on which the milling tool 6 is mounted in known manner so as to be adjustable in height, the depth of milling $t$ also being adjustable with the aid of means not described herein in detail. By means of handles 19, 19' provided on the motor housing 18 the tool can be pressed against the work 5 in the direction V, against spring pressure.

As can be seen from FIGS. 2–6, and especially from FIGS. 3 and 6, the copying member 8 is arranged on the transverse slide 15 at a distance $a$ from the milling cutter 14, and together with it is approximately in the medial plane of the slide 15 extending at right angles to the frame 1–4.

On the frame is provided a longitudinal copying rail 10 which is adjustable transversely in the direction Q and on which are arranged the two copying rails 11 which are adjustable in the longitudinal direction L. The rails 11 are each secured to a respective guide piece 13 longitudinally movable on the rail 10, a wing nut 13' serving to secure these guide pieces 13 to the rail 10. As can be seen from FIG. 5, there is provided on each of the transverse copying rails 11, 12 a shorter longitudinal copying rail 20 which is adjustable on the transverse copying rails both in the longitudinal direction L and in the transverse direction Q. Here also a fixing screw indicated at 21 is provided on a corresponding guide piece 22, so that after this screw 21 is released, the short rail 20 can be shifted in the direction L and also in the direction Q.

The longitudinal copying rail 10 is connected to a longitudinal shaft 23 which is rotatable by hand and on the ends of which are mounted two gear wheels 24 which engage with two racks 25 (FIG. 4) arranged on the transverse parts 3, 4 of the frame. In the arrangement illustrated the longitudinal shaft 23 is arranged within a hollow member, preferably a longitudinal copying rail 10 of hollow square section. A milled screw 26 connected to the shaft 23 enables this shaft to be rotated, this arrangement enabling accurate parallel displacement of the copying rail 10 in the direction Q to be effected.

Instead of this arrangement, the arrangement shown in FIGS. 7–10 can be used in which the longitudinal copying rail 10 has a carrier 27 located at right angles to the rail 10 and parallel to the plane of the frame and which is mounted on the frame viz on the longitudinal part 1a of the frame so as to be movable in the transverse direction Q and fixed in position. For this purpose the carrier 27 is guided on a pin 28 firmly connected to the part 1a of the frame and can be fixed in position by means of a clamping nut 29.

Reverting to FIGS. 1–6, the slide 15 has an extension 30 which during milling bears on the longitudinal copying rail 10 and on which is provided a copying stop 31 which is adjustable in the transverse direction Q and on which abuts the side 32 of the copying rail 10 located opposite the copying member 8.

The frame 1–4 has two jaws 33 arranged on one longitudinal side of the frame and stationary in the transverse direction, whilst on the opposite part 1 of the frame there is provided a screw 35 which can be rotated by means of a knob 34 and which presses a clamping member 36 against the work 5, so that the frame 1–4 is thereby clamped in the predetermined position on the work. The presser screw 35 is mounted in a pivotal arm 60 which in turn is pivotal about a circular bar 61 secured to the part 1 of the frame and can be fixed by means of a clamping screw 62. Due to this pivotal arrangement the clamping member 36 can be brought into the correct position at any time, viz approximately centrally between the two coacting jaws 33. Advantageously there are provided on both transverse parts 3 and 4 of the frame two stop surfaces 37 which are at a higher level than the jaws 33 and are at a distance $a_1$ from them, the distance $a_1$ corresponding to the distance $a$ of the axis 38 of the copying member from the milling axis 7.

Advantageously, the two jaws 33 are arranged so that they can be moved and fixed on a longitudinal strip 39 which has at its ends two angular projections 40 by means of which the strip can be adjusted and fixed at the level H. For this purpose there are provided in the projections 40 suitable longitudinal slots for screw threaded pins 41 mounted on the parts 3 and 4 of the frame, the strip 39 being adapted to be secured to the projections 40 by means of clamping nuts 42.

The operation of the milling tool will now be described with reference to FIGS. 1–6 and especially FIG. 5: If for example a cut 43 as shown in FIG. 5 in firm lines is to be milled, this cut also being indicated in FIGS. 3 and 6 by chain lines, the frame 1–4 can be turned into the position shown in FIG. 6 in which the stop surfaces 37 support one side of the frame on the work 5. The tool 6 is swung outwardly in the direction A. Then the fitting in question corresponding to the cutting lines 43 in FIG. 5 can be applied to the work 5. The longitudinal copying rail 10 is then placed on the side 44 of the fitting, and in the same manner the two transverse copying rails 11 and 12 are laid on the sides 45 and 46 of the fitting and fixed. Moreover, the short copying rail 20 is applied to the sides 47 and 48 of the fitting and fixed.

If desired however, with the aid of the fitting the cutting lines indicated at 43 in FIG. 5 may be drawn, the above mentioned copying rails then being adjusted in accordance with this cut. It is also possible to make adjustment if the recess is drawn with lines on the work. Then the ends 11a, 12a and the longitudinal edges 11b, 12b of the transverse rails 11, 12 are brought into register with these lines. For the purpose of adjustment of the longitudinal rail 10 and the transverse rails 11, 12 there may also be provided a scale 52 on a transverse frame part 3 or 4 and a scale 72 on the longitudinal rail 10. These scales permit adjustment in accordance with any desired dimensions of a stop.

After this adjustment of the copying rails the clamping screw 35 is released and the frame 1–4 is brought into the milling position shown in FIG. 3 and is firmly clamped. After depression of the milling tool 6 in the direction V into the position shown the milling tool is moved along the copying rails 10, 12, 20 and 11 in the longitudinal and transverse direction so that the cut indicated at 43 is accurately made. During the one longitudinal movement the copying roller is guided by the longitudinal copying rail 12 and during the other longitudinal movement it is guided by the short copying rail 20 and the stop 31 (FIG. 3) which is guided at the side 32 of the rail 10. The copying stop 31 may, as shown in FIG. 3, form the head of a screw 49 which may slide in a corresponding transverse slot 50 in the slide extension 30 and be firmly connected to the extension 30 by means of a clamping nut 51.

It is also directly possible to effect adjustment of the copying rails with the frame 1–4 in the position shown in FIG. 3. For this purpose there is provided for the transverse adjustment of the longitudinal rail 10 a scale 52 applied to the slide extension 30. If the associated fitting has the width $b_1$ (FIG. 5) for example, then in accordance with FIG. 3 the copying rail 10 is adjusted to this width $b_1$ relative to the scale 52. The associated fitting is then applied to the longitudinal copying rail 10 in this displaced setting, and the other copying rails 11, 12 and 20 are then applied an fixed in accordance with the fitting.

As can be seen from FIGS. 2, 3 and 5 in particular, the length on the transverse rails 11, 12 is the same as the spacing a of the milling cutter 14 from the copying member 8. This has the advantage that the width $b_1$ (FIG. 5) of the milling cut can be adjusted by shifting the longitudinal rail 10 until the ends 11a, 12a strike against the applied fitting.

From the above it will be seen that adjustment of the copying device is a simple, reliable and accurate operation for the user of the tool.

In the production of milling cuts in a larger number of similar work pieces (doors, windows or the like) it may be advantageous to use, instead of the copying rails described, a template 53 (FIG. 3), which is made from a strip of wood or the like and has a plurality of milled cuts 54 for different fittings and is secured to the work 5 in the position shown in FIG. 3. In order to prepare this template strip the strip 53 is first firmly clamped to the work 5 in the position indicated at 53' in FIG. 3. The various recesses are then milled in the strip 53 with the aid of the copying roller 8 and the copying rails 10–12 and 20, and in some cases the milling tool is pressed so far downwardly, in accordance with FIG. 3, that the milling 43 required for a fitting is simultaneously made in the work.

In order to prepare and use this template 53 in the way described, the copying member 8 is adjustable vertically, i.e. this copying member 8 must be located in the lower position shown in FIG. 3 when milling with this template, but in contrast must be at a somewhat higher level for making the prescribed milling cuts to make the template openings. For this purpose it is advantageous, as shown in FIG. 3, so to construct this copying roller 8 that it can be applied to the roller carrier 55, 56 in a reversed position, i.e. in the position shown or in the inverted position. For this purpose the copying roller has two bores 57 and 58 corresponding to the parts 56 and 55 of the pin serving as roller carrier. In order to clamp the copying roller 8 firmly to the part 56 of the pin a resilient click device of known type may be provided.

In the embodiment of the invention shown in FIGS. 7–10 the same reference numerals are used as for corresponding parts of FIGS. 1–6, but in some cases with suffix letter a. This embodiment differs essentially from the one first described only in that as shown in FIG. 9 a sleeve 9 arranged concentrically with the milling and motor shaft 13a is provided as the copying member, this sleeve being secured to the lower part of the motor housing 18 and its diameter $d_2$ agreeing with the diameter $d_1$ of the milling cutter. This copying sleeve 9 cooperates with the copying rails 10a, to 12a and 20a in the above described manner. This embodiment also differs from the one first described by the nature of the parallel guide means for the copying rails 10a as viewed in FIG. 10 and as already described above.

I claim:

1. A motor driven milling tool, comprising a substantially rectangular frame, clamping means for use in clamping said frame to the work, a milling tool, said milling tool comprising a substantially cylindrical rotary milling cutter and a motor drivably connected to said cutter, a cylindrical copying member of substantially the same diameter as said cutter, copying rails, and means adjustably mounting said copying rails on said frame, said copying rails comprising at least one longitudinal rail and two transverse rails, and means mounting said tool on said frame for longitudinal and transverse movement relative thereto and enabling said tool to be moved relative to said frame to permit access to said copying rails for adjustment thereof.

2. A tool according to claim 1 in which said copying rails are arranged on one longitudinal side of said frame, and there the means mounting said tool comprise a circular bar arranged on the other longitudinal side of said frame, said milling tool being mounted on said bar so as to be movable longitudinally thereon and pivotal thereabout.

3. A tool according to claim 1 including a base for said milling tool in the form of a slide, a slide carrier in which said slide is movable transversely, and means mounting said carrier for longitudinal movement relative to said frame.

4. A motor driven milling tool according to claim 1, wherein said milling tool has a base in the form of a slide, and the tool includes a slide carrier in which said slide is movable transversely, and means mounting said slide carrier for longitudinal movement relative to said frame, said copying member being arranged on said transverse slide in spaced relationship to said milling cutter, and said copying member and said cutter being located approximately in the medial plane of said slide extending at right angles to said frame.

5. A tool according to claim 1 wherein said longitudinal copying rail is transversely adjustable on said frame, and said transverse copying rails arranged on said longitudinal copying rail so as to be adjustable longitudinally.

6. A tool according to claim 1 wherein said longitudinal copying rail is transversely adjustable on said frame and said transverse copying rails are arranged on said longitudinal copying rail so as to be adjustable longitudinally, and further including shorter longitudinal copying rails arranged one on each transverse copying rail and adjustable relative thereto longitudinally and transversely.

7. A tool according to claim 1 including a longitudinal shaft rotatable by hand, two gear wheels mounted on the respective ends of said shaft, two racks arranged on the respective transverse parts of said frame and engaged by said gear wheels respectively and means connecting said longitudinal copying rail to said shaft.

8. Motor driven hand tool with copying device according to claim 1 including a carrier for said longitudinal copying rail, said carrier being arranged at right angles to said rail and parallel to the plane of said frame, and means mounting said carrier on said frame so as to be movable transversely relative thereto, and means for fixing said carrier relative to said frame.

9. A tool according to claim 1 including a base for said milling tool in the form of a slide, a slide carrier in which said slide is movable transversely, means mounting said carrier for longitudinal movement relative to said frame, an extension on said slide resting on said longitudinal copying rail, and a transversely adjustable stop, on said extension, adapted to abut the side of said longitudinal copying rail located opposite said copying member.

10. A tool according to claim 1 comprising two jaws arranged on one longitudinal side of said frame and fixed transversely, a longitudinal strip and means adjustably mounting said jaws on said strip.

11. A tool according to claim 1 including a scale on a transverse part of said frame and a further scale on said longitudinal copying rail.

12. A tool according to claim 1 wherein the length of the transverse rails is equal to the distance apart of said milling cutter and said copying member.

References Cited
UNITED STATES PATENTS

| | | | |
|---|---|---|---|
| 1,669,194 | 5/1928 | Froussard | 90—12 |
| 1,679,074 | 7/1928 | Carter | 144—27 |
| 1,753,206 | 4/1930 | Johnson | 144—144 |
| 2,427,081 | 9/1947 | Zern | 144—144 |

GERALD A. DOST, *Primary Examiner.*